United States Patent [19]

Numata et al.

[11] Patent Number: 4,556,283
[45] Date of Patent: Dec. 3, 1985

[54] AUTOMATIC VIEWING SCREEN

[75] Inventors: Kiyoshi Numata; Toshihiro Yoshida; Takashi Kokubo, all of Tokyo, Japan

[73] Assignee: Sony Corporation, Tokyo, Japan

[21] Appl. No.: 537,398

[22] PCT Filed: Jan. 11, 1983

[86] PCT No.: PCT/JP83/00011
§ 371 Date: Sep. 9, 1983
§ 102(e) Date: Sep. 9, 1983

[87] PCT Pub. No.: WO83/02503
PCT Pub. Date: Jul. 21, 1983

[30] Foreign Application Priority Data
Jan. 11, 1982 [JP] Japan ............................. 57-2012[U]

[51] Int. Cl.⁴ ...................... G03B 21/56; G03B 21/10; G03B 21/30
[52] U.S. Cl. .................................. 350/117; 352/104; 353/72
[58] Field of Search ................... 350/117; 353/72, 74, 353/67; 352/104; 160/24, 203

[56] References Cited
U.S. PATENT DOCUMENTS 2,812,808 11/1957 Nicholas ............................... 160/24
4,351,592 9/1982 Link et al. ............................. 353/72

Primary Examiner—Richard A. Wintercorn
Attorney, Agent, or Firm—Hill, Van Santen, Steadman & Simpson

[57] ABSTRACT

An automatic screen for projecting an image from a video projector onto it is disclosed. It has a cabinet 1 which accommodates a screen 2. The screen 2 can be moved relative to the cabinet by a chain 5a coupling a front door 1a of the cabinet 1 and a sprocket. The front door 1a of the cabinet 1 is opened in an interlocked relation to the operation of bringing the screen 2 to a set position projected from the cabinet 1. When the screen 2 is no longer used, it can be brought back into the cabinet 1, and in an interlocked relation to this motion the front door 1a of the cabinet 1 is closed.

6 Claims, 7 Drawing Figures 4,556,283

AUTOMATIC VIEWING SCREEN

BACKGROUND OF THE INVENTION

1. Field of the Invention

This invention relates to a screen device used for a video projector or the like.

2. Description of the Prior Art

In a usual video projector system, an image projected from a projector is directed to a screen via a reflector.

In the prior art system, the screen is supported in the state projected from a support by screen poles projecting therefrom.

This type of screen is large in size as a whole, so that it can be installed only in comparatively large rooms. It also has great influence on the effect of the interior decorative design, and if it is too large, it is obstructive when it is out of use, so that it is rather impractical as an indoor device.

Further, with the prior art device of this type, the screen surface is exposed at all times so that it is liable to be contaminated by attached dust to reduce the reflectivity of the screen.

SUMMARY OF THE INVENTION

The present invention is directed to overcoming the various difficencies of the prior art screen, and its object is to provide on automatic screen, which has a mechanism for permitting a screen to be accommodated in a cabinet to make it compact when the projector system is out of use and also permitting the screen to be readily brought out from the cabinet to a working position in response to a swtich operation or the like.

According to the present invention, there is provided an automatic screen, which comprises a screen and a cabinet capable of accommodating the screen and a front door pivoted or hinged to the front of the cabinet for opening and closing the cabinet. The screen and front door can be moved relative to each other by a common driving mechanism in a well-bucket fashion when the screen is brought out of and into the cabinet. When using the projector system for projection of an image onto the screen, the screen is brought to a position projected from the cabinet concurrently with the opening of the cabinet front door, and is held at the projected position. After use, the screen can be brought into the cabinet and the cabinet front door is closed. The screen thus can be held projected from the cabinet only while the projector is in use, and at other times the cabinet front door is held closed so that the device looks like an ordinary indoor furniture and can be utilized as an interior decorative item. Further, since the screen is not exposed but is accommodated in the cabinet when the projector is out of use, there is no possibility of accidentally breaking the screen. Furthermore, the device as a whole is compact and convenient for arrangements that may be done when the projector system is out of use.

BEST MODE OF THE INVENTION

Now, the best mode of the present invention will be described with reference to FIGS. 1 through 4 of the accompanying drawings.

FIG. 1(A) is an exterior view showing an embodiment of the present invention in an out-of-use state with a screen accommodated in a cabinet, and FIG. 1(B) is an exterior view showing the device in use with the screen projected from the cabinet.

Figure 1:
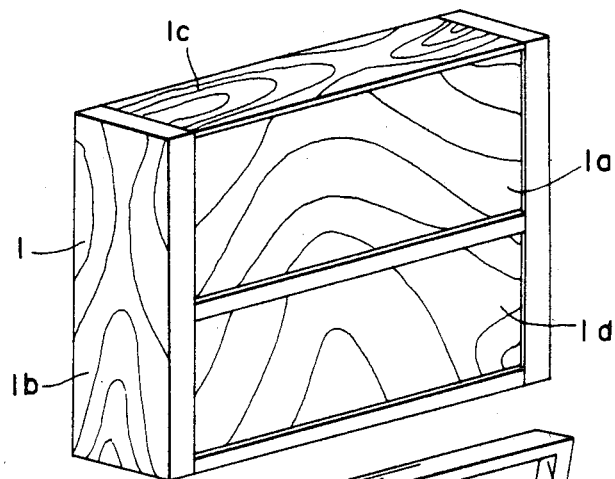
FIG. 1 is an external perspective view showing a screen device according to the present invention, with FIG. 1(A) showing the device in the state with the screen accommodated and FIG. 1(B) showing the same in the state in use for projection.
Figure 1:
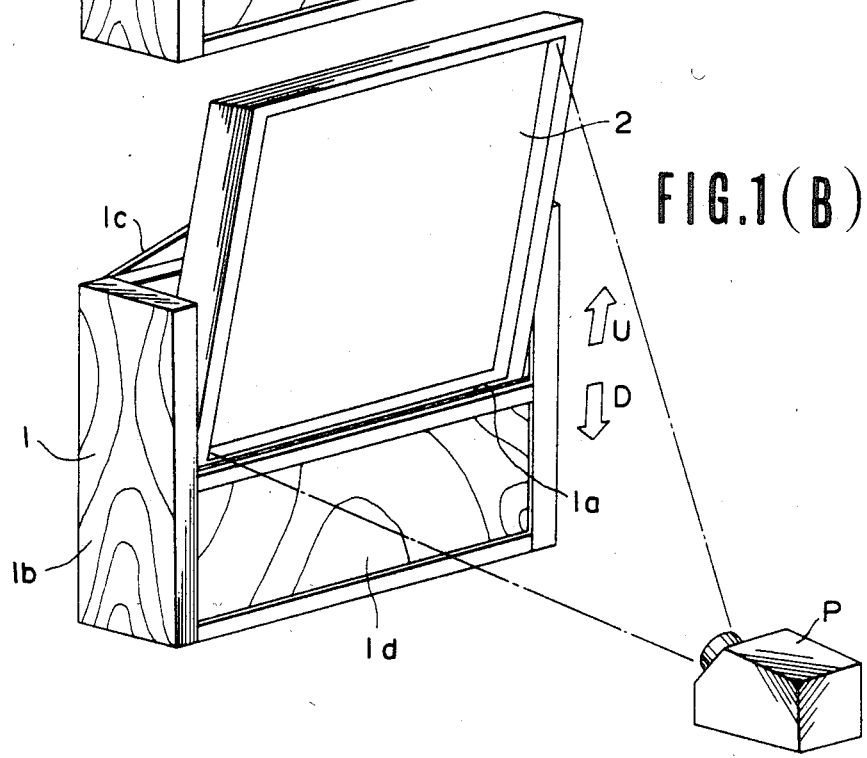
Figure 2:
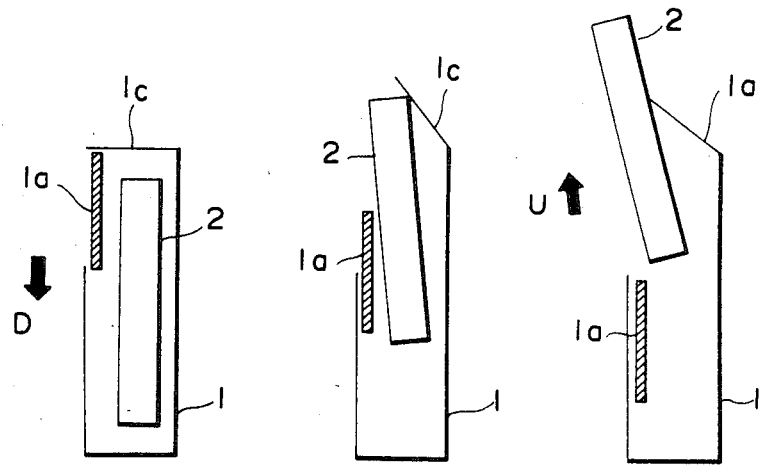
FIG. 2 is diagrammatic side view of the relative movement relation among a front door, a screen and a top door, with FIG. 2(A) showing the state with the screen accommodated, FIG. 2(B) showing the state with the screen being moved out of or into a Cabinet, and FIG. 2(C) showing the state with the screen in the projected position.

As shown in FIG. 1, a cabinet 1 of the automatic screen according to the present invention has a box-like shape with a grain-like pattern provided on its outer surface 1b. When the device is out of use, it serves to accommodate a screen 2. When the screen is in use, it serves as a support to hold the screen 2 in a state for projection of image thereon.

The upper half of the front of the cabinet 1 is constituted by a front door 1a which is movable in vertical directions. The top of the cabinet 1 is constituted by a top cover 1g with the rear edge thereof hinged by a hinge mechanism for opening and closing. The lower half of the front of the cabinet 1 has a stationary front panel 1d. When the front door 1a is opened, it is accommodated in the cabinet on the back of the front panel 1d.

The cabinet accommodates a coupling mechanism and a driving mechanism for causing relative movement of the front door 1a and screen 2 to be described later in detail.

When using the screen 2 for projection, the front door 1a is moved and opened in the direction of arrow D in FIG. 1(B). The screen 2 is thus brought to a position to assue a forwardly tilted state projecting in the direction of arrow U. Designated at P is a projector.

The relation among the front door 1a, screen 2 and top cover 1c will now be described in detail with reference to FIGS. 2(A), 2(B) and 2(C). As shown in FIG. 2(A), the front door 1a closing the upper half of the front of the cabinet 1 is lowered in the direction of arrow D by coupling mechanism and driving mechanism to be described later, and the screen 2 accommodated in the cabinet 1 is relatively moved to project in the direction of arrow U while pushing open the top cover 1c to a position at which it is exposed and inclined.

Figure 3:
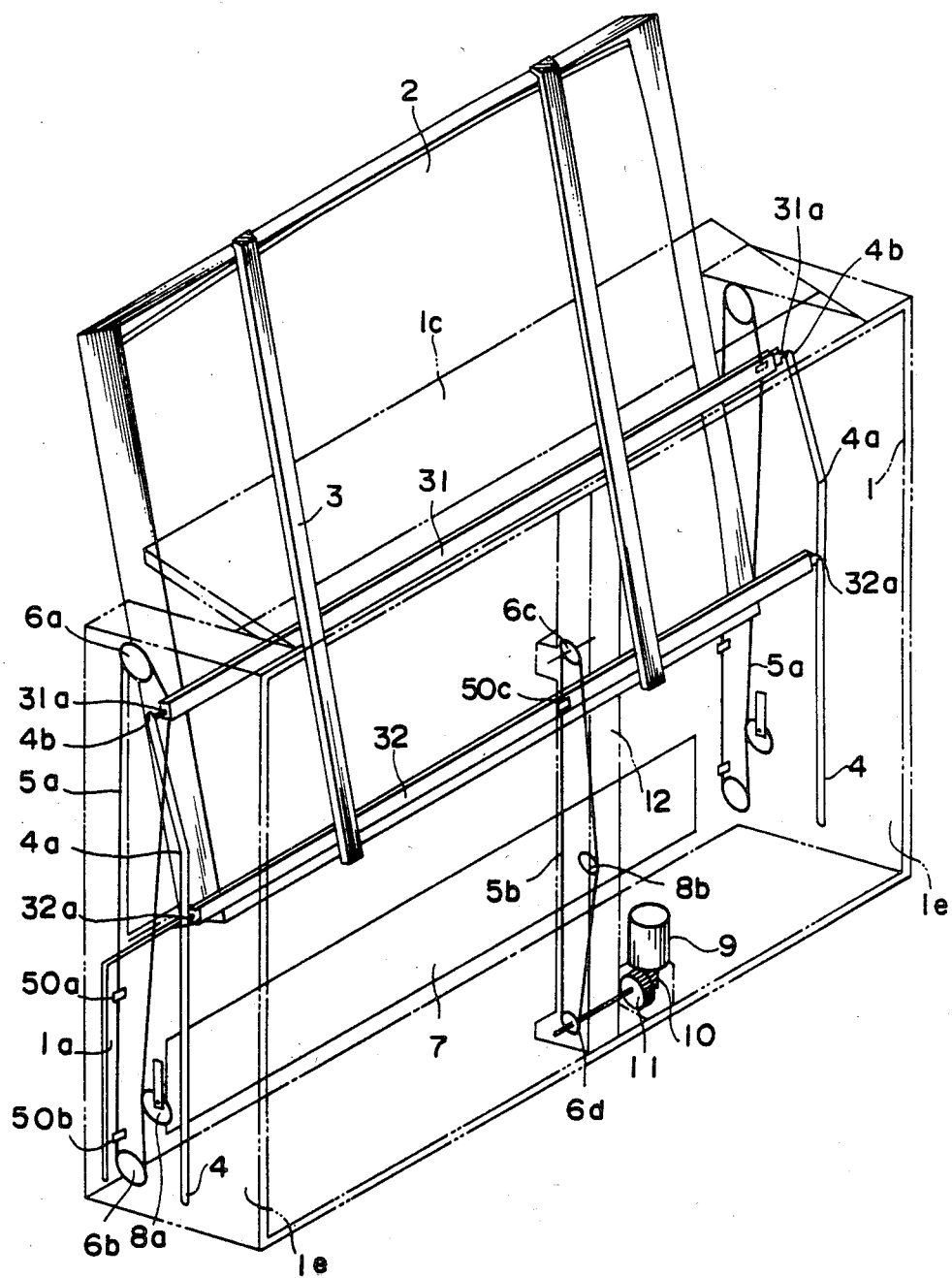
FIG. 3 is a perspective view showing the back side of the internal construction of an embodiment of the automatic screen according to the present invention.

An example of the coupling mechanism and driving mechanism for causing relative movement of the front door 1a and screen 2 will now be described with reference to FIG. 3.

The screen 2 is mounted on a screen bracket structure 3 consisting of angular pipes or the like assembled into a lattice-like form. The bracket structure 3 is constructed such that it has sufficient mechanical strength against bending, twisting and other deformations despite of its simple and light-weight structure.

Transversal screen brackets 31 and 32 provided, and their length is substantially equal to the width of the cabinet 1. Their opposite ends have engagement portions 31a and 32a.

The engagement portions 31a and 32a are slidably engaged with slide rails 4 provided on the opposite side inner walls 1e of the cabinet 1.

The slide rails 4 each have an upper portion inclined toward the front of the cabinet 1 from their intermediate portion 4a. The screen 2 thus can be held in a state suitably forwardly tilted when it is used for projection. Rail portions under the intermediate portion 4a extend vertically so that the screen 2 can be guided vertically when it is brought into the cabinet 1 for accommodation.

Now the coupling mechanism for causing relative movement of the screen 2 and front door 1a will be described.

A chain 5a for causing the relative movement has its intermediate portion secured to the neighborhood of the opposite ends of the transversal bracket 31 noted. It is passed round pair sprockets 6a and 6b rotatably supported on an upper and lower portion of the opposite inner side walls 1e of the cabinet. Securement members 50a and 50b are secured to the inner surface of the front door 1a between the sprockets 6a and 6b and in a portion, to which the bracket 31 is secured, and an opposite side portion.

The front door 1a and screen 2 are coupled together by the chain 5a in a well-bucket fashion.

When the front door 1a is lowered, the screen 2 is moved along the slide rails 4 so that top cover 1c of the cabinet is raised and pulled up to a predetermined height level by the upper edge of the screen.

The upward movement of the screen 2 is stopped when the engagement portions 31a strike upper end portions 4b of the slide rails 4, whereby stable lock can be obtained. When the screen 2 is accommodated from its projected position into the cabinet 1, the chain passed round the sprockets 6a and 6b is pulled by the screen 2 being lowered, whereby the front door 1a is pulled down to the initial position.

The front door 1a has a balance weight 7 secured to its inner side to make the weights of it and the screen 2 substantially equal. The relative movement of the screen 2 and front door 1a thus can be brought about with only a slight force.

Further, the chain 5a is held taut with a constant tension by a tightener 8a provided on the opposite side inner walls 1e of the cabinet. The sprockets 6a and 6b are thus reliably coupled together without possibility of sagging of the chain 5a, thus permitting smooth relative movement.

Now, the driving mechanism for causing the relative movement of the screen 2 and front door 1a will be described.

The relative movement of the screen 2 and front door 1a is caused by the driving force of a motor 9 installed in the cabinet 1.

The driving mechanism includes a lifter base 12 embedded in and vertically projecting from a central portion of the inner side of the cabinet 1. A sprocket 6c is mounted on the lifter base 12 at a predetermined position thereof, and also a sprocket 6d interlocked to the motor 9 is provided. A chain 5b is passed round the pair sprockets 6c and 6d and is secured by a securing member 50c to a central portion of the screen bracket 32.

A tightener 8b is provided on the lifter base 12 to make the coupling of the chain 5b to the sprockets 6c and 6d reliable.

With the driving mechanism described above provided on the central portion of the screen 2, satisfactory lateral balance can be obtained, and the screen 2 can be stably and smoothly brought out of and into the cabinet.

In the driving mechanism, the transmission of driving force is done without agency of any gear head but through a work 10 and a worm wheel 11 requiring low manufacturing cost. More specifically, the worm 10 is integrally mounted on a drive shaft of the motor 9, while the worm wheel 11 which is in mesh with the worm 10 is mounted on a shaft of the sprocket 6d. The driving torque of the motor 9 is thus reduced in speed through the worm 10 and worm wheel 11 to be transmitted to the sprocket 6d, whereby the chain 5b is pulled to cause vertical movement of the screen 2. The switching of the directions of the vertical movement of the screen 2 may be done by switching the directions of rotation of the motor 9 through the switching of the power source switch (not shown).

When the screen 2 is vertically moved by the driving mechanism, the front door 1a is relatively moved relative to the screen 2 owing to the coupling mechanism of coupling the screen 2 and front door 1a by the chain 5a.

Figure 4:
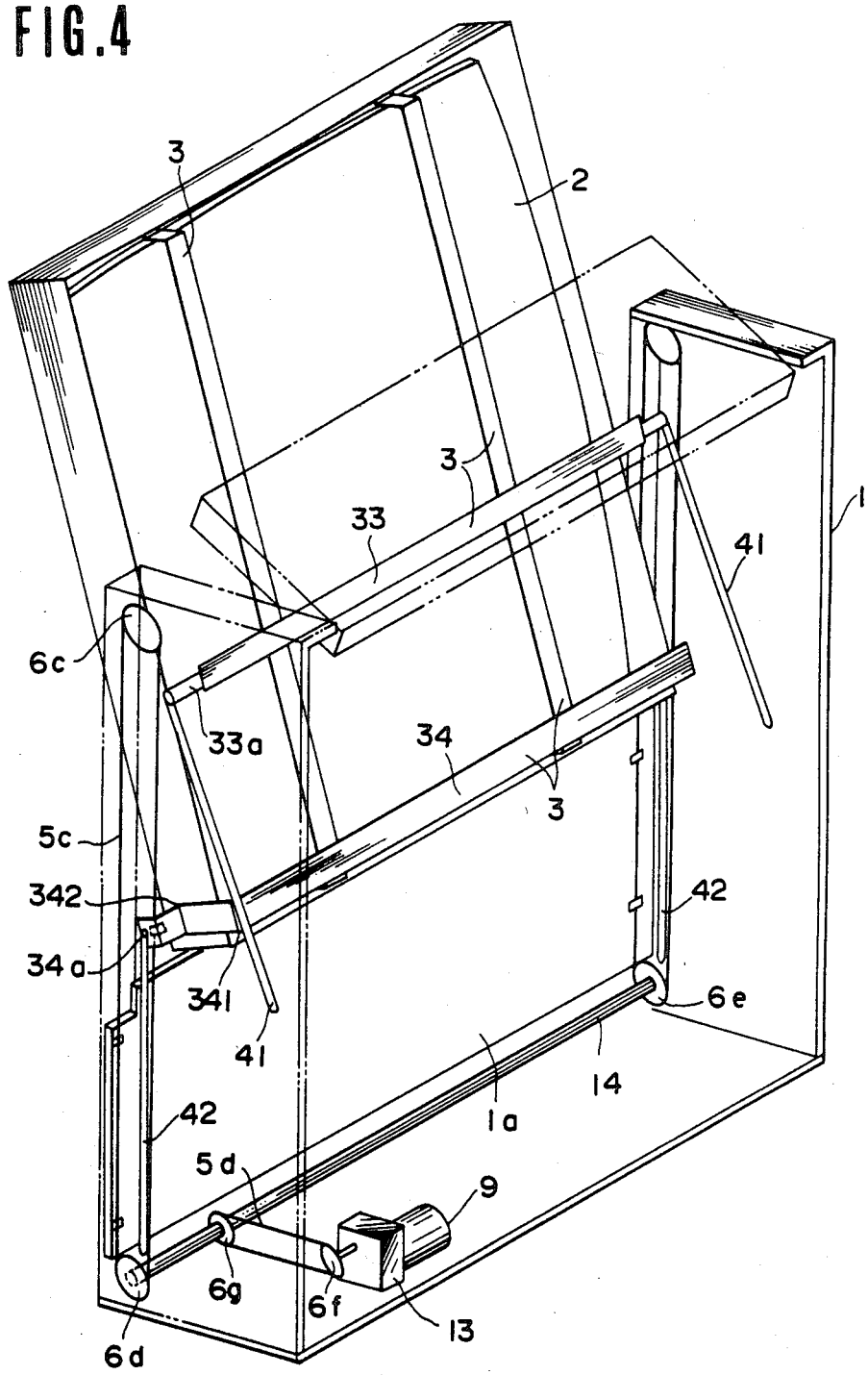
FIG. 4 is a perspective view showing the back side of the internal construction of a different embodiment of the automatic screen according to the present invention.

A different embodiment of the automatic screen according to the present invention will now be described with reference to FIG. 4.

In this embodiment, a screen bracket coupling mechanism and driving mechanism different from those in the preceding embodiment are provided.

Screen bracket 3 in this embodiment, like that in the preceding embodiment, has a structure consisting of angular pipes assembled in a lattice-like form.

In this embodiment, however, slide rails 41 and 42 are different from those in the preceding embodiment, so that the engagement portions of transversal screen brackets 33 and 34 have a different shape.

To be more specific, of the slide rails 41 and 42 in this embodiment, the slide rail 41 guide the screen 2 to a forwardly tilted state, while the other slide rail 42 guide the lower end of the screen 2 in vertical directions.

The engagement portions 33a provided at the opposite ends of one screen bracket 33 are engaged with the slide rails 41 for guiding the screen 2, while the engagement portions 34a provided at the opposite ends of the other screen bracket 34 are engaged with the slide rails 42 for vertically guiding the lower portion of the screen 2.

The screen bracket 34 is bent at a point 341 such that the bent portion extends along the side wall of the screen 2 and is bent at another point 342 such that the bent portion extends outwardly of the screen to reach the slide rails 42.

A chain 5c coupling the screen 2 and front door 1a are secured to the engagement portion 34a provided at the end of the screen bracket 34. The chain 5c is passed round pair sprockets 6c and 6d provided on upper and lower portions of the inner wall of the cabinet 1. Its other intermediate portion is secured to the inner side of the front door 1a, so that the screen 2 and front door 1a are moved relative to one another.

Now, a driving mechanism for causing the relative movement of the front door 1a and screen 2 will be described.

In the driving mechanism in this embodiment, the driving force of the motor 9 provided in the cabinet 1 is transmitted through a speed reduction gear train provided in the cabinet 1 and pair sprockets 6f and 6g to a driving shaft 14 provided between left and right sprockets 6d and 6e of the coupling mechanism noted above.

Of the pair sprockets 6f and 6g, the sprocket 6f is provided on the shaft, on which a gear coupled to the motor 9 is mounted. The other sprocket 6g serves to rotate the driving shaft 14. The two sprockets are coupled together by a chain 5d.

The driving force of the motor 9 is transmitted through the sprockets 6f and 6g to the driving shaft 14 to synchronously drive the pair sprockets 6c and 6d so as to drive the chain 5c passed round the sprockets 6c and 6d, thereby causing relative movement of the screen 2 and front door 1a.

As has been described, with automatic the screen according to the present invention the screen is projected from the cabinet when it is used and is accommodated in the cabinet when it is not used.

The automatic screen in the out-of-use state with its front door closed thus has the same appearance as an ordinary cabinet. If the cabinet is provided with grain-like pattern on its surface or is made of wood, it will thus provide the same appearance and mood as an ordinary interior furniture item and can be utilized as an interior decorative item.

Further, since the screen is accommodated in the cabinet when the device is out of use, its surface will never be damaged or broken because it is not exposed. Furthermore, the device is made compact as a whole and is convenient for arrangements that may be done when the device is out of use.

Further, since the screen and front door are moved relative to each other such that the screen is projected through an opening formed with the downward movement of the front door, the screen need be moved a short distance to its exposed set position. That is, less power is required for the relative movefment. Further, the automatic screen in the state of use is compact and can be utilized even in a comparatively narrow place. Further, its centroid is at a low level, so that it can be stablyinstalled.

Further, with the balance weight provided on the inner side of the front door to make the weights of the screen and front door substantially equal, the relative movement of the screen and front door can be caused with a slight driving force.

Since the automatic screen according to the present invention has the effects discussed above, it can provide a novel practical value to the screen used with a projector or the like and can provide improved versatility.

What is claimed is:

1. A disappearing viewing mechanism comprising an upright viewing screen, a cabinet enclosing said screen, an opening in an upper portion of said cabinet, a closure for said opening, conveyor means operating to convey said upright screen upwardly of said cabinet and into view above said cabinet and said opening, and means interconnecting said closure and said screen simultaneously moving said closure into open condition and said screen into its upper viewing position, or the reverse thereof.

2. The structure of claim 1 wherein said interconnecting means comprises a reversible drive conveyor.

3. The structure of claim 2 wherein said closure substantially counterbalances said screen in conveyor operation.

4. The structure of claims 1, 2 or 3 wherein said closure is in the front wall of the cabinet adjacent to the uppermost edge thereof.

5. The structure of claim 4 including a pivoted top portion on said cabinet permitting said screen to project at least in part through said top.

6. The structure of claim 4 wherein said screen is conveyed into a tilted position in its uppermost position.

* * * * *